United States Patent
Colucci

(10) Patent No.: US 7,097,771 B2
(45) Date of Patent: Aug. 29, 2006

(54) IN-TANK TIME RELEASE ION EXCHANGE RESIN CONTAINING A FUEL ADDITIVE

(75) Inventor: William J. Colucci, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 301 days.

(21) Appl. No.: 10/640,364

(22) Filed: Aug. 13, 2003

(65) Prior Publication Data

US 2005/0035045 A1    Feb. 17, 2005

(51) Int. Cl.
  *B01D 15/04*  (2006.01)
  *C10L 10/00*  (2006.01)

(52) U.S. Cl. ............ 210/660; 44/603; 44/629; 123/1 A; 137/268; 210/198.1; 210/263; 210/502.1; 210/696; 222/1

(58) Field of Classification Search .......... 210/206, 210/209, 263, 266, 660, 679, 681, 696–701, 210/749, 683, 685, 198.1, 502.1; 44/629, 44/639, 603; 422/261–264; 123/1 A, 568.12; 137/268; 208/290, 299; 222/1
See application file for complete search history.

(56) References Cited

U.S. PATENT DOCUMENTS

| | | | |
|---|---|---|---|
| 2,367,803 A | 1/1945 | Schindler | |
| 3,838,043 A | 9/1974 | Crook et al. | |
| 4,888,425 A * | 12/1989 | Herdle | 544/402 |
| 5,023,275 A * | 6/1991 | Amick | 514/627 |
| 5,068,044 A * | 11/1991 | Brownawell et al. | 508/172 |
| 5,296,228 A * | 3/1994 | Chang et al. | 424/422 |
| 5,300,218 A * | 4/1994 | Graiff et al. | 208/299 |
| 6,124,513 A * | 9/2000 | Heilman et al. | 585/12 |
| 6,238,554 B1 | 5/2001 | Martin | |
| 6,379,564 B1 * | 4/2002 | Rohrbach et al. | 210/765 |
| 6,827,750 B1 * | 12/2004 | Drozd et al. | 44/629 |
| 6,835,218 B1 * | 12/2004 | Drozd et al. | 44/459 |
| 6,851,414 B1 * | 2/2005 | Gao et al. | 123/568.12 |
| 6,860,241 B1 | 3/2005 | Martin et al. | |

FOREIGN PATENT DOCUMENTS

| | | |
|---|---|---|
| DE | 23 61 025 | 6/1975 |
| EP | 1 061 251 A2 | 12/2000 |
| WO | WO 03/018726 A1 | 3/2003 |

* cited by examiner

*Primary Examiner*—Joseph Drodge
(74) *Attorney, Agent, or Firm*—Dennis H. Rainear

(57) ABSTRACT

The invention provides a device containing an ion-exchange resin to which is chemically bound a fuel additive material which will gradually be released from the resin into a fuel in which the device is placed.

13 Claims, No Drawings

IN-TANK TIME RELEASE ION EXCHANGE RESIN CONTAINING A FUEL ADDITIVE

FIELD

The present invention relates to a device for delivering fuel additives to a fuel via a time-release ion-exchange resin. The resin can be comprised of a strongly acidic (sulfonic) or weakly acidic (carboxylic) highly reticulated polymer, to which is bound, for example, an amine-containing detergent that provides beneficial deposit or combustion control when released gradually into a fuel that is consumed in an engine. One location for the device containing the resin is in the fuel tank of a vehicle.

BACKGROUND

Additives for fuels have long been known and used to improve combustion, reduce emissions, minimise or clean up combustion chamber deposits and in-take valve deposits. Such fuel additives have traditionally been blended with the fuel at the refinery, or added later in the pipeline or in transit between the refinery and the final consumer.

It is difficult to maintain a constant or desired level of an additive in the fuel. Typically an operator adds a bottled additive to the vehicle fuel tank with each fuel fill-up. While many bottled fuel additives are commercially available, often operators do not consistently add the additive with each fill-up. The additive might not be readily available or the operator may forget to include the additive. When the additive is added to the fuel tank, it does not always form a homogeneous mixture with the fuel. Fuel tanks do not include reliable methods for mixing fuel. Generally operators rely upon the turbulence created during a fill-up and by vehicle motion to mix the additive and fuel. Furthermore, the additive concentration in the fuel may vary, depending upon the amount of fuel added—assuming a set amount of additive is added with each fill-up.

Ion exchange resins have been used in various chemical systems for the exchange or release of certain chemically bound materials.

U.S. Pat. No. 6,238,554 teaches a fuel filter for use with internal combustion engines. The fuel filter includes a fuel additive that can be released into fuel.

Therefore, a need exists for a device and method to provide a fuel additive to a fuel supply in a time-release manner.

SUMMARY OF THE EMBODIMENTS

An embodiment presented herein provides a device for delivering at least one fuel additive to a fuel, said device comprising a time-release ion-exchange resin to which is removably attached a fuel additive.

Another embodiment provides a method for supplying a fuel additive to a fuel comprising: providing to a fuel supply an ion-exchange resin to which is removably bound a fuel additive; displacing the fuel additive from the ion-exchange resin by means of replacing the additive on the ion-exchange resin with a contaminant or component in the fuel, whereby the fuel additive is released into the fuel.

The rate of release for the fuel additive can be controlled by the design of the ion-exchange resin selection and the acid-base chemistry of the fuel additive bound thereto. In one form the fuel additive can be released at a substantially constant rate to maintain a uniform level of fuel additive in the fuel.

It is to be understood that both the foregoing general description and the following detailed description are exemplary and explanatory only and are intended to provide further explanation of the present invention, as claimed.

DETAILED DESCRIPTION OF EMBODIMENTS

In one form is provided a device containing an ion-exchange resin which can be basic or acidic in its binding capacity. The resins can be anion or cation exchange resins.

| Anion Exchange Resins | Cati n Exchange Resins |
|---|---|
| Strongly Basic Isoporous | Strongly Acidic Gel |
| Strongly Basic Gel | Weakly Acidic Gel |
| Strongly Basic Macroporous | Strongly Acidic Macroporous |
| Weakly Basic Macroporous | Chelating Resins (Macroporous) |

In the acidic form of ion-exchange resins useful herein can be included, for example and not as a limitation, those with carboxylic acid groups or the sodium or potassium salt thereof, phosphorous-containing groups, phosphonic groups, phosphoric groups, and any other acidic groups able to coordinate with or to or bond with a fuel additive. Strong acid cation forms can also include the Lewatit™ and Ionac brand resins available from Sybron Chemicals, Inc.

Spectra/Gel® Ion Exchange Resins are durable, insoluble, and compatible with most aqueous and organic solvents. The structural polymeric backbone of the resin is styrene cross-linked with 2% to 8% divinylbenzene. The amount of cross-linkage determines both the pore size of the media and the capacity of the resin. The type of exchange performed (cation or anion) is determined by functional groups added to the resins. Cation exchange resins have, for example, a sulfonic acid functional group as the ion exchange site. Both cation and anion exchange resins are useful in the present invention.

In the basic form of ion-exchange resins useful herein can be included those with one or more amine or amino groups, alkyl- or alkyleneamines, quaternary ammonium salts, triazine groups, or other reactive chemical sites. Anion exchange resins can have, for example, a trimethylbenzylammonium functional group as the ion exchange site. Certain ethyleneamines are also used in the manufacture of specific weak-base type ion exchange resins. These resins are used in various water treatment and industrial processing applications, and are of the polyamine, amine-modified styrene-divinylbenzene, aminated phenol-formaldehyde, or amine-modified acrylic resin types. The following Ethyleneamines available from Dow Chemical are appropriate for use in making ion-exchange resins useful herein: Diethylenetriamine (DETA), Triethylenetetramine (TETA), and Tetraethylenepentamine (TEPA). DOWEX SBR is an example of an effective cross-linked quaternary ammonium ion-exchange resin from Dow Chemical.

Other resins useful herein include resins available from Rohm & Hass, such as, AMBERCHROM™ (macroporous, polymeric reversed phase liquid chromatography) resins; AMBERJET® resins; AMBERLITE®; AMBERLITE FP®; AMBERLYST®; DUOLITE®; IMAC™; Acrylic anion resins; Amberlite® IRA958 Cl resin; XAD polymeric adsorbents; and Duolite® Phenol-formaldehyde resins.

The ion-exchange resin can be a polystyrene-based material such as Diphonix® resin from Eichrom Industries, Inc.

Diphonix® contains diphosphonic acid groups that function as chelating ligands that exhibit significant selectivity for absorbing certain metals.

The total capacity of an ion exchange resin is defined as the total number of chemical equivalents available for exchange per some unit weight or unit volume of resin. The capacity may be expressed in terms of milliequivalents per dry gram of resin or in terms of millequivalents per milliliter of wet resin.

The more highly crosslinked a resin, the more difficult it becomes to introduce additional functional groups. Sulfonation is carried out after the crosslinking has been completed and the sulfonic acid groups are introduced inside the resin particle as well as over its surface. Likewise, the quaternary ammonium groups are introduced after the polymerization has been completed and they too are introduced both inside the particle as well as on its surface. Fewer functional groups can be introduced inside the particles when they are highly crosslinked and hence the total capacity on a dry basis drops slightly.

The physical size of the resin particles may be determined by the polymerization step. Screens are used to sieve resins to get a fairly uniform range of sizes. Mesh sizes in the following table refer to U.S. Standard screens. A higher mesh number means more and finer wires per unit area and thus a smaller opening. Ion-exchange resin beads of all sizes can be used within a permeable membrane or bound to a substrate in the devices and methods of the present invention.

| Mesh Range | Diameter of Particles | |
|---|---|---|
| | Inches | Micrometers |
| 20–50 | 0.0331–0.0117 | 840–297 |
| 50–100 | 0.0117–0.0059 | 297–149 |
| 100–200 | 0.0059–0.0029 | 149–74 |
| 200–400 | 0.0029–0.0015 | 74–38 |
| minus 400 | <0.0015 | <38 |

The fuel additives useful herein can include, but are not limited to, lubricity additives, combustion improvers, detergents, dispersants, cold flow improvers, dehazers, demulsifiers, cetane improvers, antioxidants, scavengers, pollution suppressants, and other additives known to those skilled in the art.

The useful combustion improvers herein can include, but are not limited to, manganese-containing fuel additives, such as methyl cyclopentadienyl manganese tricarbonyl (available commercially as MMT® Fuel Additive from Ethyl Corporation).

Another useful fuel additive herein is isostearic imidazoline, which can be releaseably bound to a substrate according to the present invention.

By "fuel" herein is meant a fuel selected from the group consisting of gasoline, middle distillate fuel, diesel, bio diesel, kerosene, mixtures thereof and precursors thereof.

In the practice of the present invention, the fuel additive is chemically or physically bound to, coordinated with, chelated or otherwise associated with the ion-exchange resin through the acidic or basic groups located on the resin. The ion-exchange resins are designed to have a characteristic and known binding/equilibrium constant so that the exchange or release of the bound material can be tailored to the desired end use. In one embodiment, a fuel component (such as any undesired byproducts) or a fuel contaminant (such as any impurities from a refinery stream) encounters the site of attachment or association between the fuel additive and the ion-exchange resin. The fuel component or fuel contaminant has sufficient acidity or basicity to displace or exchange the bound fuel additive from the ion-exchange resin, thereby releasing the fuel additive into the fuel, and whereby the fuel component or fuel contaminant becomes bound at the location on the ion-exchange resin previously held by the fuel additive. In this manner, the fuel is cleaned by the binding to the resin and removal of contaminants, and the fuel is also "additized" whereupon the additive can perform its intended function in improving combustion, reducing NOx/SOx/hydrocarbon emissions, reducing or preventing deposit formation on fuel injectors, valves and/or combustion chambers, improving cold flow performance, imparting demulsification, dehazing, and detergency to the fuel.

The ion-exchange resins useful herein can be any ion-exchange resin able to releaseably or reversibly bind a material useful as a fuel additive. Thus, for example and not as a limitation, the ion-exchange resin can be selected from polystyrenic polymers with sulfonic acid groups, or polystyrenic polymers with quaternary ammonium groups, ethyleneamines, or other nitrogen-containing moieties.

The shape or form of the ion-exchange resins can be any useful for the release of the fuel additive. Thus, for example, the ion-exchange resin can be, or be contained in or on, beads, a polymer strip or strings, a polymer membrane, a polymer block or solid piece, or combinations or modifications thereof.

In one embodiment, the ion-exchange resin and its fuel additive is contained within a permeable membrane, such as but not limited to a mesh bag or net through which the fuel and its contaminant or component can flow to engage the ion-exchange resin and its bound fuel additive. The fuel-permeable membrane can be, for example and not as a limitation herein, nylon, dacron, polyester, polyimide, polycarbonate, and/or any other polymeric, natural or synthetic material which will not degrade the fuel into which it is immersed. Thus, provided herein is a device for supplying an additive to a fuel and adapted to release the fuel additive into said fuel at a controlled rate, said device comprising: a fuel-permeable housing assembly defining a chamber; and an ion-exchange resin to which is removably bound a fuel additive disposed within said chamber. The housing assembly can comprise, for example, a permeable or semipermeable screen, mesh, bag, filter, frit, tube, container, box, cage, receptacle, or any other suitable device able to retain the ion-exchange resin and admit fuel to contact said resin. The housing assembly can hold the resin in loose form, such as a mesh bag of the resin beads, or the assembly can be a rigid member or flexible solid piece to which is adhered the resin containing the fuel additive.

In an embodiment, the fuel additive can be, for example, dimethyl amino propylamine (DMAPA) triazine (1,3,5-tris[3-(dimethylamino)propyl]hexahydro-1,3,5-triazine) or isostearic imidazoline bound to a basic ion-exchange resin.

The present invention also provides a method for providing a fuel additive to a fuel supply. Thus, an embodiment includes a method for supplying a fuel additive to a fuel comprising: providing to a fuel supply an ion-exchange resin to which is removably bound a fuel additive; displacing the fuel additive from the ion-exchange resin by means of replacing the additive on the ion-exchange resin with a material in the fuel, whereby the fuel additive is released into the fuel.

The present invention also provides a system for supplying an additive to a fuel and adapted to release the fuel additive into said fuel at a controlled rate, said system comprising an ion-exchange resin to which is removably bound a fuel additive; a fuel supply vessel containing said resin; and fuel.

The device of the present invention can be placed in the fuel tank or anywhere in the fuel supply line of a vehicle where the device will contact the fuel. The vehicle can be any of a car, a truck, a bus, an aircraft, a train, a recreation vehicle, a water craft, a motorcycle, a moped, a scooter, an all-terrain vehicle, or other fuel-powered vehicle or engine.

Devices of the present disclosure may provide uniform time-released treatment of a fuel with a fuel additive from an ion-exchange resin for up to about five years or more.

The following examples further illustrate aspects of the present disclosure but are not intended to limit the present disclosure.

EXAMPLES

Example 1

Using Amberlyst® 15 Ion-Exchange Resin (Rohm and Haas, Strongly acidic reticular resin with sulfonic acid functionality @5.08 meq/g) and treating with 1,3,5-tris[3-(dimethylamino)propyl]hexahydro-1,3,5-triazine as follows:

253.05 g of Amberlyst® 15 resin was saturated with methylene chloride solvent for 2 hours, and the triazine (160 g) is added dropwise slowly to control the exotherm such that the temperature remained below the boiling point of the methylene chloride. After allowing to stand for 1 hr, the slurry was filtered and washed with pentane, then dried under vacuum. The yield was 349.23 g. The resin capacity is 38%.

Example 2

In a second experiment as above: 297.95 g Amberlyst® 15 resin, 120 g triazine, yielded 388.44 g of treated resin, 30% capacity.

Example 3

Using Amberlite® IRC-50 as above: 192.79 (dried in oven at 80 C, weakly acidic carboxylic acid functionality @ 10 meq/g wet), 158.86 g triazine, yielded 216.04 g, 12% capacity.

Example 4

Using Amberlite® IR-120(plus): 201.27 g (dried of water in oven at 80 C, strongly acidic sulfonic acid resin @ 4.4 meq/g wet wt, 10.36 meq/g dry), 20.08 g triazine, yielded 220.46 g, 10% reagent-limited capacity.

Dimethyl amino propylamine (DMAPA) triazine fuel additive can be reacted with an ion-exchange resin in the form of beads to achieve a 5% to 60% functionality of active sites on the resin. The DMAPA fuel additive thereby becomes reversibly bound to the ion-exchange resin polymer. The polymer beads are then placed within a mesh bag made of a synthetic or natural material and the bag placed within the gas tank of a vehicle such as an automobile. The gas tank is then filled with regular gasoline that does not contain DMAPA fuel additive and allowed to stand for several hours. The engine of the vehicle is started and run for 5 to 60 minutes without adverse effect. A fuel sample can then be taken from the tank and analysed for the presence of the DMAPA fuel additive that had been released from the ion-exchange resin into the gas. The presence of DMAPA in the gas demonstrates the utility of the present invention.

Other embodiments of the present invention will be apparent to those skilled in the art from consideration of the specification and practice of the invention disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the invention being indicated by the following claims.

What is claimed is:

1. A device for delivering at least one fuel additive to a fuel upon immersion in the fuel, said device comprising an ion-exchange resin having an equilibrium constant whereby ion exchange occurs in response to chemical equilibrium forces sufficient to effectuate an exchange, and to which a fuel additive is reversibly bound by a chemical interaction, wherein the ion-exchange resin is selected from the group consisting of anionic exchange resins and cationic exchange resins having acidic or basic groups located on the resin, and wherein the fuel additive is at least partially removed from the ion-exchange resin in exchange for a component in the fuel which reversibly binds to the ion-exchange resin, and wherein the fuel additive is selected from the group consisting of lubricity additives, combustion improvers, cold flow improvers, dehazers, demulsifiers, cetane improvers, antioxidants, scavengers, pollution suppressants, manganese tricarbonyl additives, isostearic imidazoline, NOx/SOx hydrocarbon emission reducers, and deposit formation reducers and preventers.

2. The device of claim 1, wherein the fuel is selected from the group consisting of gasoline, middle distillate fuel, diesel, bio diesel, kerosene, and mixture thereof or precursors thereof.

3. The device of claim 1, wherein the ion-exchange resin is selected from the group consisting of anionic exchange resins.

4. The device of claim 1, wherein the ion-exchange resin is selected from the group consisting of cationic exchange resins.

5. The device of claim 1, wherein the fuel additive is at least partially removed from the ion-exchange resin through reversible exchange with a contaminant in the fuel.

6. The device of claim 5, wherein the contaminant in the fuel is an impurity.

7. The device of claim 1, wherein the fuel additive is selected from the group consisting of lubricity additives, combustion improvers, detergents, dispersants, cold flow improvers, dehazers, demulsifiers, cetane improvers, antioxidants, scavengers, and pollution suppressants.

8. The device of claim 1, wherein the fuel additive comprises a manganese-containing compound.

9. The device of claim 1, wherein the device further comprises a permeable membrane through which fuel can permeate into the device and the fuel additive can permeate out of the device.

10. A machine having an engine, said machine comprising the device of claim 1.

11. A device for supplying an additive to a fuel and adapted to release the fuel additive into said fuel at a controlled rate upon immersion of the device in the fuel, said device comprising:
 a fuel-permeable housing assembly defining a chamber; and
 an ion-exchange resin having an equilibrium constant whereby ion exchange occurs in response to chemical equilibrium forces sufficient to effectuate an exchange, disposed within said chamber to which a fuel additive is reversibly bound by a chemical interaction, wherein the ion-exchange resin is selected from the group consisting of anionic exchange resins and cationic exchange resins having acidic or basic groups located on the resin, and wherein the fuel additive is at least partially removed from the ion-exchange resin in exchange for a component in the fuel which reversibly binds to the ion-exchange resin, and wherein the fuel additive is selected from the group consisting of lubricity additives, combustion improvers, cold flow improvers, dehazers, demulsifiers, cetane improvers, antioxidants, scavengers, pollution suppressants, manganese tricarbonyl additives, isostearic imidazoline, NOx/SOx hydrocarbon emission reducers, and deposit formation reducers and preventers.

12. A method for supplying a fuel additive to a fuel comprising:
 immersing in a fuel an ion-exchange resin having an equilibrium constant whereby ion exchange occurs in response to chemical equilibrium forces sufficient to effectuate an exchange, selected from the group consisting of anionic exchange resins and cationic exchange resins having acidic or basic groups located on the resin to which is reversibly bound a fuel additive; chemically displacing the fuel additive from the ion-exchange resin in exchange for a component in the fuel which reversibly binds to the ion-exchange resin, whereby the fuel additive is released into the fuel, and wherein the fuel additive is selected from the group consisting of lubricity additives, combustion improvers, cold flow improvers, dehazers, demulsifiers, cetane improvers, antioxidants, scavengers, pollution suppressants, manganese tricarbonyl additives, isostearic imidazoline, NOx/SOx hydrocarbon emission reducers, and deposit formation reducers and preventers.

13. A system for supplying an additive to a fuel and adapted to release the fuel additive into said fuel at a controlled rate, said system comprising:
 an ion-exchange resin having an equilibrium constant whereby ion exchange occurs in response to chemical equilibrium forces sufficient to effectuate an exchange, to which a fuel additive is reversibly bound by a chemical interaction, wherein the ion-exchange resin is selected from the group consisting of anionic exchange resins and cationic exchange resins having acidic or basic groups located on the resin, and wherein the fuel additive is at least partially removed from the ion-exchange resin in exchange for a component in the fuel which reversibly binds to the ion-exchange resin, and wherein the fuel additive is selected from the group consisting of lubricity additives, combustion improvers, cold flow improvers, dehazers, demulsifiers, cetane improvers, antioxidants, scavengers, pollution suppressants, manganese tricarbonyl additives, isostearic imidazoline, NOx/SOx hydrocarbon emission reducers, and deposit formation reducers and preventers.

* * * * *